(12) United States Patent
Agrawal et al.

(10) Patent No.: US 12,549,014 B1
(45) Date of Patent: Feb. 10, 2026

(54) MODULAR AND SCALABLE TECHNIQUE FOR MEASUREMENT OF DER/SOURCE PARAMETERS FOR MULTI-PHASE AND MULTI-SOURCE SYSTEM FOR ISE AND METERING APPLICATIONS

(71) Applicant: EATON INTELLIGENT POWER LIMITED, Dublin (IE)

(72) Inventors: Arpit Agrawal, Pune (IN); Praveen Kumar Singh, Pimpri-Chinchwad (IN); Uday Prakashrao Mhaskar, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 18/958,160

(22) Filed: Nov. 25, 2024

(51) Int. Cl.
*H02J 3/44* (2006.01)
*H02J 3/38* (2006.01)
*H02J 3/388* (2026.01)

(52) U.S. Cl.
CPC .............. *H02J 3/44* (2013.01); *H02J 3/388* (2020.01); *H02J 2203/10* (2020.01)

(58) Field of Classification Search
CPC ........... H02J 3/44; H02J 3/388; H02J 2203/10
See application file for complete search history.

(56) References Cited

U.S. PATENT DOCUMENTS

2015/0061387 A1* 3/2015 Daniel ................... H02S 50/00
307/24

* cited by examiner

*Primary Examiner* — Carlos Amaya
(74) *Attorney, Agent, or Firm* — Eckert Seamans Cherin & Mellott, LLC

(57) ABSTRACT

Software-based source voltage parameter monitoring is provided for load centers that include one or more DERs. The software enables a system energy manager (SEM) controller to monitor the relevant source voltage parameters of each DER and other voltage sources to ensure that each DER meets applicable safety standards when connecting to and disconnecting from the utility grid. The software eliminates the need to install off-the-shelf (OTS) chips in hardware used within a load center to communicate the source voltage parameters of each voltage source to the SEM controller. Instead, the software enables an SEM controller to detect the voltage signal output by each voltage source in a load center, and uses a dynamically generated internal control signal that is transformed to a rotating reference frame to detect the RMS voltage, phase angle, and frequency of each voltage source output. Eliminating OTS chips eliminates communication latency and increases system reliability.

15 Claims, 6 Drawing Sheets

MODULAR AND SCALABLE TECHNIQUE FOR MEASUREMENT OF DER/SOURCE PARAMETERS FOR MULTI-PHASE AND MULTI-SOURCE SYSTEM FOR ISE AND METERING APPLICATIONS

FIELD OF THE INVENTION

The disclosed concept relates generally to interconnection system equipment (ISE), and in particular, to systems and methods for measuring source parameters in power distribution systems having multiple power sources.

BACKGROUND OF THE INVENTION

DER (distributed energy resource) systems are relatively small-scale power sources that generate electricity on-site for individual electricity consumers and can be interconnected to the utility electrical grid. DERs enable a consumer to supplement and sometimes replace their use of utility power and can also supply power to the utility grid. The interconnection to the utility grid necessitates that applicable safety standards are followed, including UL 1741 and IEEE 1547 Table 3 requirements. Such requirements govern the steps that must be taken when both intentional and unintentional islanding of a DER system occurs, responsive to a variety of conditions, including: high voltage ride through (HVRT), low voltage ride through (LVRT), high frequency ride through (HFRT), low frequency ride through (LFRT), and response to rate-of-change-of-frequency (ROCOF).

A power distribution system that includes one or more DERs can be considered a microgrid, and a master system controller is used in such a microgrid to ensure that the relevant source voltage parameters of any DER complies with applicable safety standards when connecting to and disconnecting from the utility grid. Currently, the prevailing solution to ensure compliance of DERs with the applicable safety standards is to install an off-the-shelf (OTS) chip in one or more entities in the microgrid so that each OTS chip can communicate the source voltage parameters of each power source to the master controller, said parameters including: frequency, phase angle, and RMS voltage. For instance, an OTS chip can be installed in each DER or an OTS chip can be installed in the system manager that includes the microgrid master controller. In one illustrative example, if the DER in a given microgrid is a solar PV array, an OTS chip can be installed in the inverter for the array, and the OTS chip would communicate with the microgrid controller. The controller monitors the same parameters for the voltage provided by the utility grid, and uses the information from the utility grid and the OTS chips to determine when and how each DER can safely interconnect to and disconnect from the microgrid.

While OTS chips fulfill the need of providing the required measured data to be used for interconnection and disconnection of DERs, each OTS chip used in a given microgrid introduces additional latency to the system as the measured parameters are transmitted between the OTS chip and the microgrid controller, typically on a scale approaching milliseconds. In addition, any time an additional component such as an OTS chip is added to a system, the additional component introduces another potential source of error in the system and increases the system cost by a significant amount.

There is thus room for improvement in systems and methods for ensuring compliance of DERs and other ISE with applicable standards for grid interconnection.

SUMMARY OF THE INVENTION

These needs, and others, are met by embodiments of a system energy manager (SEM) controller for a load center that monitors source parameters for both grid voltage and downstream voltage sources such as DERs using a software-based approach.

In one exemplary embodiment of the disclosed concept, a system energy manager is provided for use with a load center, the load center being structured to connect a plurality of loads to a plurality of voltage sources through a main bus, the plurality of voltage sources including a utility grid and a number of distributed energy resources, DERs. The system energy manager includes a system energy manager (SEM) controller configured to execute a source parameter measurement scheme. The source parameter measurement scheme includes a number of signal generator modules, each signal generator module comprising: an internal control signal generator (ICSG) module and a source parameter output module. For each given voltage source in the plurality of power sources, the SEM controller is configured to receive a source voltage signal from the given voltage source. The ICSG module is configured to receive the source voltage signal and a feedback frequency signal as input, with the feedback frequency signal having an angular frequency. The angular frequency corresponds to a fundamental frequency of the source voltage signal, the fundamental frequency being in hertz. The ICSG module is configured to output the source voltage signal and an internal control signal. The SPO module is configured to generate a reference frame signal from the internal control signal and the source voltage signal, the reference frame signal having the angular frequency. The SPO module is configured to extract source voltage parameters from the source voltage signal using the reference frame signal. The SPO module is configured to produce the feedback frequency signal using the internal control signal and the source voltage signal.

In another exemplary embodiment of the disclosed concept, a method of determining source parameters for a voltage source in a load center is provided. The method comprises: providing a signal generator module, the signal generator module comprising an internal control signal generator (ICSG) module and a source parameter output (SPO) module; providing a source voltage signal and a feedback frequency signal as inputs to the ICSG module, the source voltage signal being output by the voltage source; producing an internal control signal with the ICSG module based on the inputs to the ICSG module; providing the internal control signal and the source voltage signal as inputs to the SPO module; generating a reference frame signal by transforming the internal control signal to a rotating reference frame using the SPO module; using the rotating reference frame signal to extract the source parameters in the SPO module; and outputting the source parameters and the feedback frequency signal.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
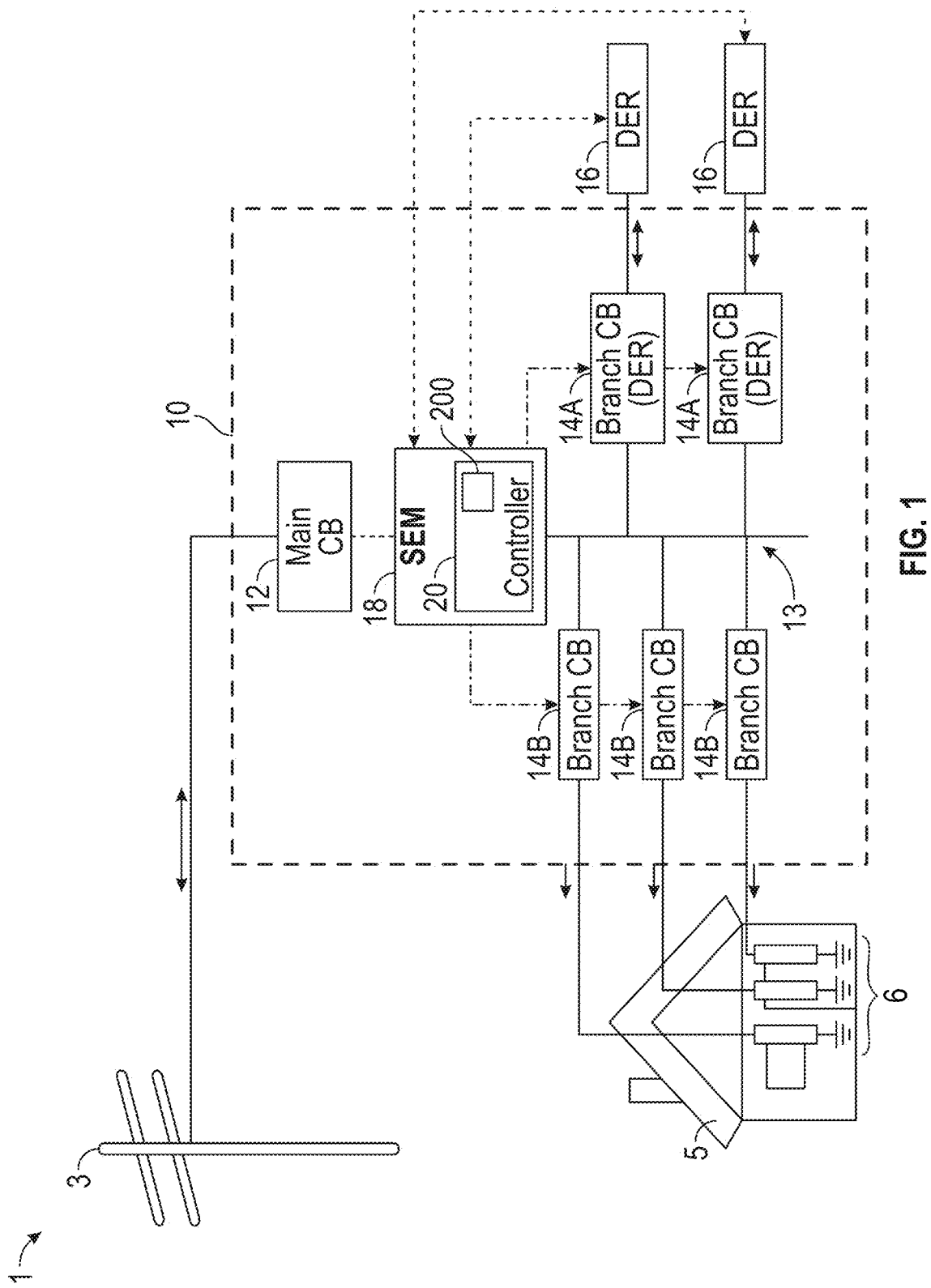
FIG. 1 is a diagram of an exemplary power distribution system including a load center with a system energy manager (SEM) controller that ensures compliance of DER systems with applicable safety standards, in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As used herein, the singular form of "a", "an", and "the" include plural references unless the context clearly dictates otherwise.

As employed herein, when ordinal terms such as "first" and "second" are used to modify a noun, such use is simply intended to distinguish one item from another, and is not intended to require a sequential order unless specifically stated.

As employed herein, the term "controller" shall mean a programmable analog and/or digital device that can store, retrieve and process data; a processor; a control circuit; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As employed herein, the term "number" shall mean one or an integer greater than one (i.e., a plurality).

Disclosed herein is an improved system controller for a microgrid that eliminates the need for OTS chips to monitor source parameters of DERs and other voltage sources in microgrids, by using a completely controller-based approach rather than a combination controller and OTS chip-based approach. More specifically, the advantageous approach disclosed herein is completely software-based and eliminates the need to use OTS chips to determine voltage source parameters in a microgrid.

Reference is now made to FIG. 1, which is a diagram of a power distribution system 1 that includes a load center 10 with an exemplary system energy manager controller 20, in accordance with an example embodiment of the disclosed concept. The power distribution system 1 includes the utility electrical grid 3 and supplies power to a building 5 via the load center 10. The building 5 is wired to enable a plurality of loads 6 to receive power supplied to the building 5. The load center 10 includes a main circuit breaker 12 with a main bus 13, a plurality of branch circuit breakers 14 connected to the main bus 13, a number of distributed energy resource (DER) systems 16, and a system energy manager (SEM) 18 with a controller 20 (referred to hereafter as the "SEM controller 20"). Each DER 16 is connected to the main bus 13 via one of the branch circuit breakers 14 and can comprise, for example and without limitation, a solar PV array, a battery, a generator, etc. While two DERs 16 are shown in FIG. 1, it should be understood that other quantities of DERs 16 can be connected to the load center 10.

The main circuit breaker 12 is referred to hereafter as the "main breaker 12" for brevity, and the branch circuit breakers 14 are referred to hereafter as the "branch breakers 14" for brevity. Each branch breaker 14 is additionally identified with a letter, i.e. 'A' or 'B', to enable differentiation between a branch breaker 14 that is connected to a power source and a branch breaker 14 that is connected to a load, with each branch breaker 14A being connected to one of the DERs 16 and each branch breaker 14B being connected to one of the loads 6. All of the branch breakers 14A and 14B can be referred to generally using the reference number 14. The main breaker 12 is the most upstream entity in the load center 10, while the system energy manager 18 is immediately downstream of the main breaker 12 and thus the second-most upstream entity in the load center 10. The main breaker 12 must be closed for the load center 10 to receive power from the utility grid 3.

The SEM controller 20 is in communication with the utility grid 3, the main breaker 12, all of the branch breakers 14, and the DERs 16. As detailed further later herein, the SEM controller 20 monitors both upstream and downstream source parameters for the voltages supplied by the utility grid 3 and the DERs 16, said source parameters including: frequency, phase angle, and RMS voltage. In particular, the SEM controller 20 executes a software-based source parameter measurement scheme 200 that is explained in further detail later herein in connection with FIGS. 2A-2C.

The SEM controller 20 also executes islanding and grid-connecting functions for the load center 10. The system energy manager 18 can include a relay that enables islanding of either the entire building 5 or only a portion of the building 5. In addition, the SEM controller 20 can command the main breaker 12 to open when the SEM controller 20 determines that the load center 10 needs to be islanded, and the SEM controller 20 can command the main breaker 12 to close when the SEM controller 20 determines that the load center 10 needs to be connected to the utility grid 3. The DERs 16 supply power to the loads 6 via the main bus 13, and to the extent that the DERs 16 produce power in excess of what is consumed by the loads 6, the SEM controller 20 facilitates the load center 10 supplying the surplus power to the utility grid 3.

The system energy manager 18 comprises input/output capabilities that enable a user to provide input to the SEM controller 20 and that outputs information about operating conditions in the load center 10 to the user. It will be appreciated that different consumers will have different objectives for their load center 10, which may be dictated by the nature of the specific DERs 16 included in the load center 10 and by the nature of the loads 6. For example, a first consumer may want to enable the DER 16 to supply power to the load center 10 at all times (i.e. regardless of whether the load center 10 is grid-connected or islanded) in order to reduce the amount of power consumed from the utility grid 3, a second consumer may want to only enable the DER 16 to supply power to the load center 10 only when a threshold demand is provided by one or more of the loads 6, and a third consumer may want to enable the DER 16 to supply power to the load center 10 only when the load center 10 is islanded from the utility grid 3. The system energy manager 18 is configured to enable the user of the load center 10 to input the user's specific power use objectives to the system energy manager 18, and the SEM controller 20 is configured to try to optimize conditions in the load center 10 in order to meet the user's objectives while prioritizing compliance with the applicable safety standards.

For any load center 10 that includes one or more DERs 16 with the ability to connect and disconnect from the utility grid 3, installing the SEM controller 20 in the load center 10 will ensure that the load center 10 complies with applicable safety standards, such as UL 1741 and IEEE 1547 Table 3, without the use of OTS chips. Hereinafter, the term "applicable safety standards" should be understood to refer to UL 1741 and IEEE 1547 Table 3. The applicable safety standards govern the conditions for performance, operation, testing, safety, and maintenance of the interconnection, as well as the ability of energy sources to comply with intentional and unintentional islanding requirements (e.g. high voltage ride through (HVRT), low voltage ride through (LVRT), high frequency ride through (HFRT), low frequency ride through (LFRT), and response to rate-of-change-of-frequency (ROCOF)).

Existing load centers that include DERs use a master controller to ensure safe and effective islanding, reconnection, and communications among the various entities connected to the load center, because DERs are typically invisible from the perspectives of the main breaker and branch breakers. That is, without a master controller, uncoordinated islanding and/or reconnection may result in situations in which both the electrical grid and the DERs are generating voltages that are not synchronized, creating significant safety hazards. In such existing load centers, as previously stated, OTS chips can be connected to various combinations of each DER/downstream device in the load center and the master controller, with each OTS chip being configured to obtain the relevant voltage source parameters from each power source (e.g. each DER, the utility grid) in real time, and the master controller determines how and when islanding and reconnection of each DER can be achieved after receiving all necessary information from each OTS chip.

Figure 2A:
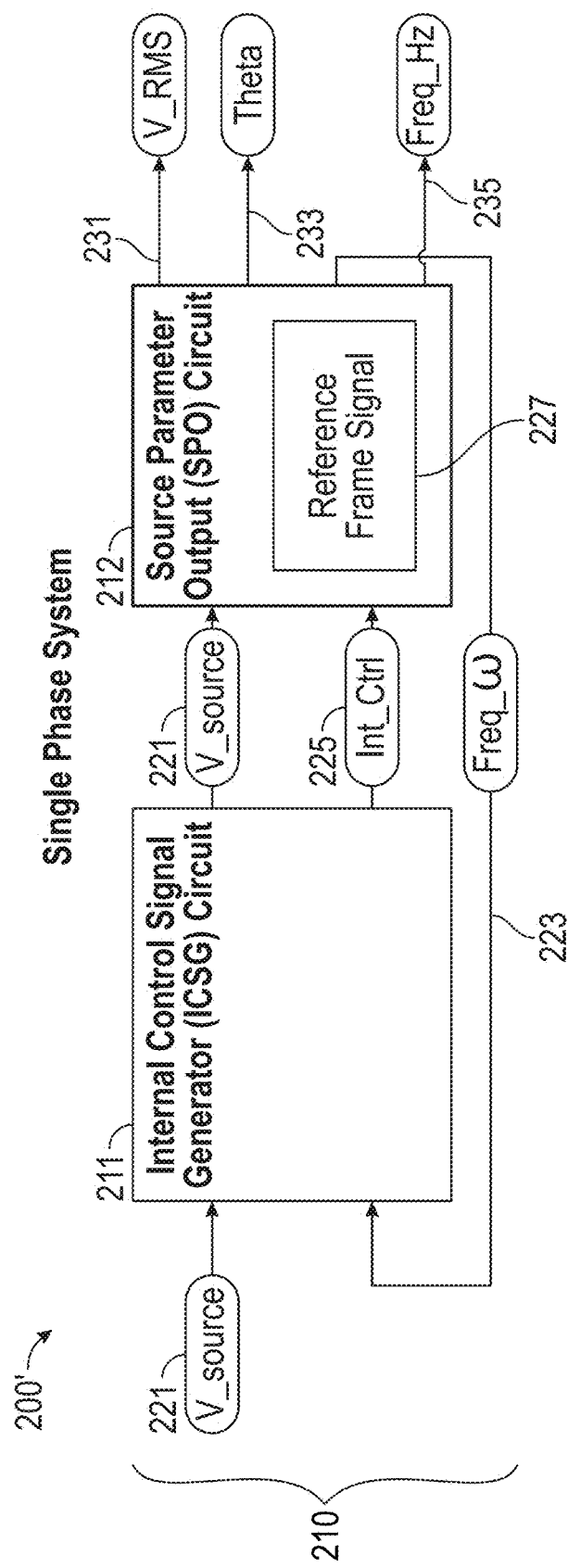
FIGS. 2A-2C are block diagrams that show the input(s) to and outputs from the SEM controller of FIG. 1 for determining the source parameters of voltage sources in single phase, split phase, and three phase power systems, in accordance with an example embodiment of the disclosed concept.
Figure 2B:
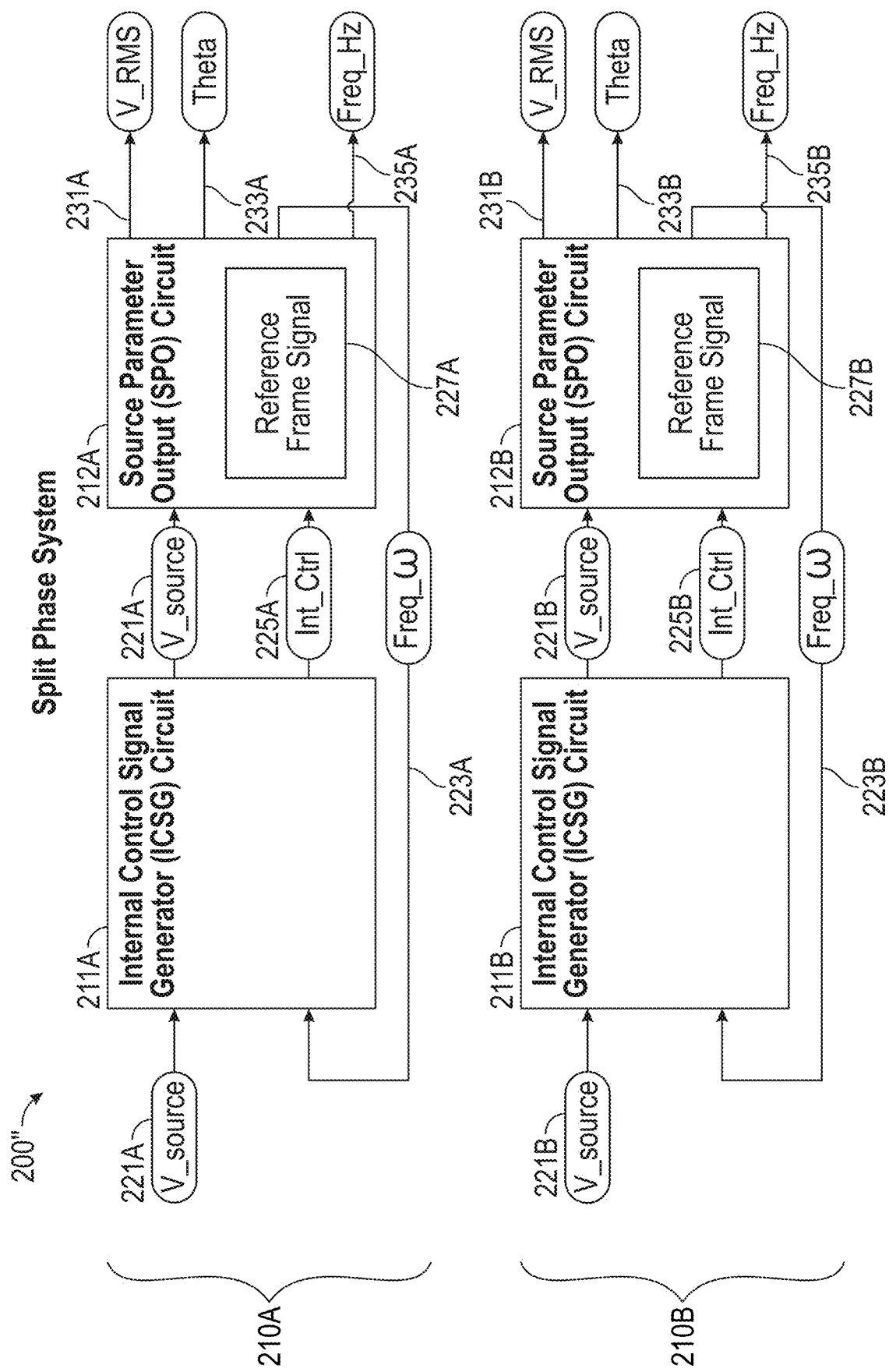
Figure 2C:
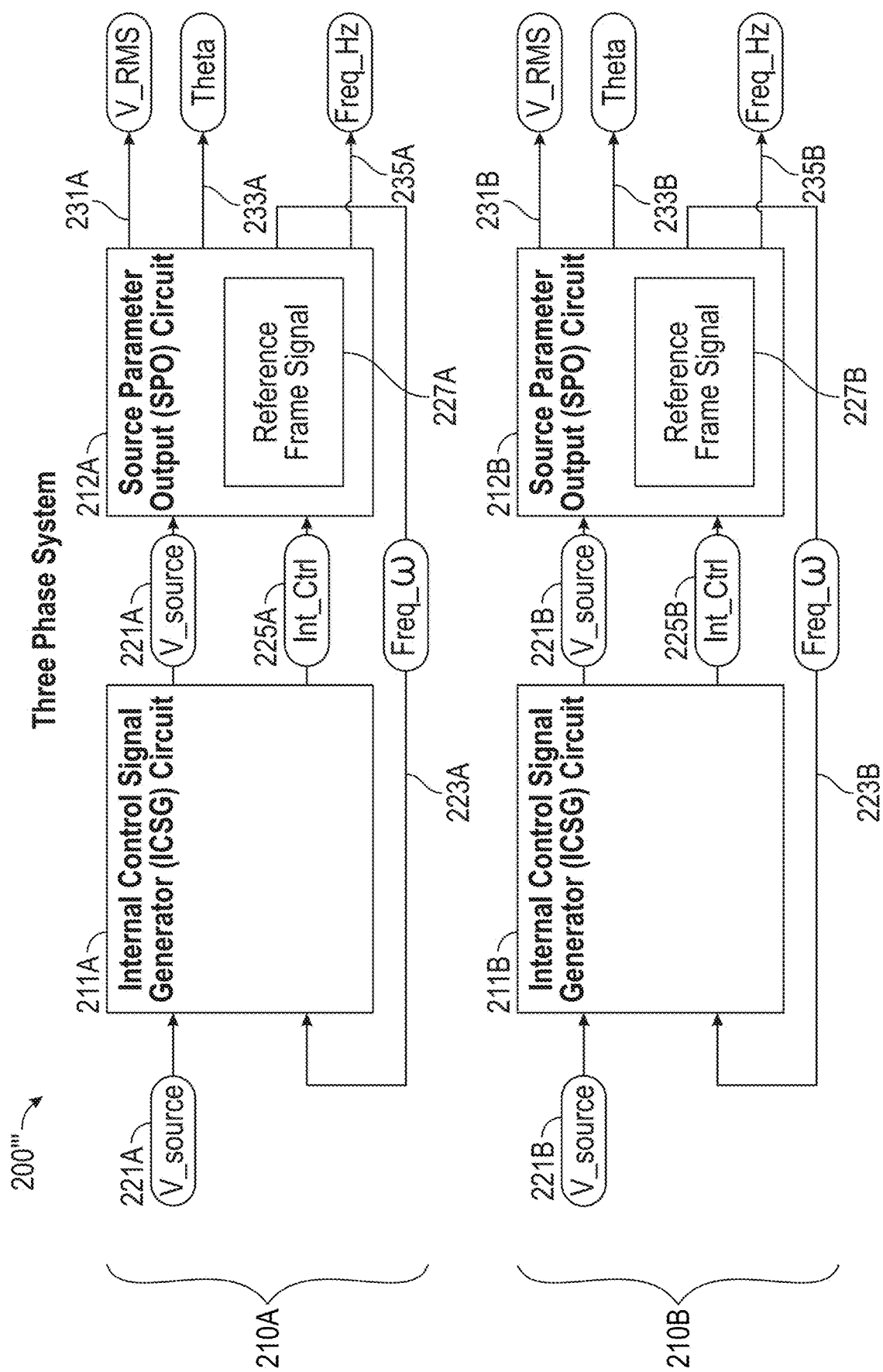
Figure 2C:
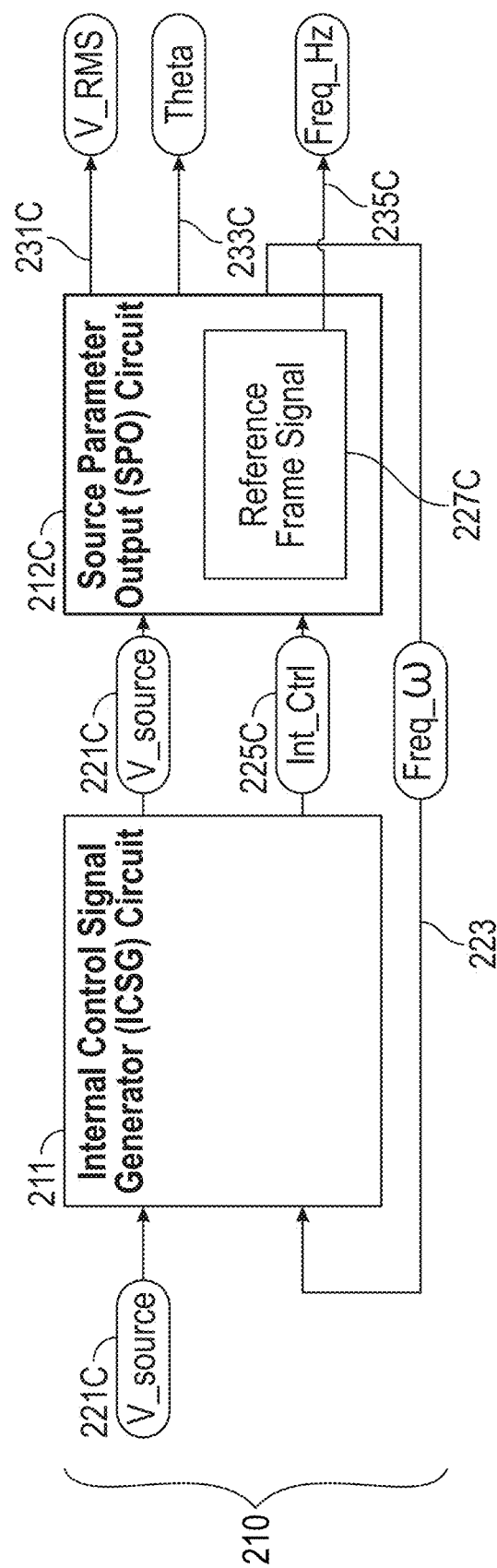

As detailed hereafter in connection with FIGS. 2A-2C, the disclosed improved SEM controller 20 is configured to monitor the source parameters for all upstream and downstream voltage sources in the load center 10, i.e. the utility grid 3 (via the main breaker 12) and the DERs 16. The ability of the SEM controller 20 to monitor source parameters for the DERs 16 using a software-based approach eliminates the need for OTS chips and provides an improvement over existing master controllers that rely on OTS chips to obtain the source parameter data for DERs and other voltage sources. The advantages of eliminating OTS chips include eliminating the latency that arises from communication between an OTS chip and a system controller. The SEM controller 20 is configured to execute a software algorithm to obtain voltage and current data sensed by each of the main breaker 12 and branch breakers 14 in order to make decisions necessary for islanding the load center 10 and connecting the load center 10 to the utility grid 3, as well to make decisions for connecting and disconnecting each DER 16 from the main bus 13.

Reference is now made to FIGS. 2A-2C, which are block diagrams showing single phase, split phase, and three phase implementations of the software-based source parameter measurement scheme 200 executed by the SEM controller 20 to track RMS voltage, frequency, and phase angle of the DERs 16 in the power distribution system 1, in accordance with an exemplary embodiment of the disclosed concept. As previously stated, it should be noted that the SEM 20 tracks the source parameters of the utility grid 3 and monitors all downstream loads (such as the loads 6), i.e. the SEM 20 is not restricted to only monitoring the DERs 16. However, in the explanation of the source parameter measurement scheme 200 provided herein, reference is primarily made to the source parameter measurement of the DERs 16, due to the elimination of the OTS chips for measurement of DER source parameters in particular being innovative.

Each of the source parameter measurement schemes shown in FIGS. 2A-2C can be referred to generally with the reference number 200, and the reference numbers 200', 200", and 200''' are used in FIGS. 2A, 2B, and 2C to denote how the general scheme 200 is respectively implemented in a single phase system, a split phase system, and a three phase system. Each measurement scheme 200 includes one unique signal generator (SG) module 210 for each phase of power in the load center 10, such that the single phase measurement scheme 200' includes one SG module 210, the split phase measurement scheme 200" includes two SG modules 210, and the three phase measurement scheme 200''' includes three SG modules 210. It is noted that the source parameter measurement scheme 200 is intended for use in load centers having fewer than four phases of power. Each of the SG modules 210 shown in FIGS. 2A-2C can be referred to generally with the reference number 210, and the addition of the letter 'A', 'B', or 'C' to the reference number 210 in FIGS. 2B and 2C is used to enable differentiation between one power phase's SG module 210 and another power phase's SG module 210.

Reference is now made to FIG. 2A. Because each SG module 210 is used with a single phase of power, it will be appreciated that each SG module 210 functions in the same manner, so the functioning of the SG modules 210 is explained in conjunction with the SG module 210 for the single phase implementation shown in FIG. 2A. The SG module 210 comprises an internal control signal generator circuit 211 (referred to hereafter as the ICSG 211) and a source parameter output circuit 212 (referred to hereafter as the SPO 212), with the outputs of the ICSG 211 being provided as inputs to the SPO 212.

A source voltage signal 221 output by the specific voltage source being monitored is input to the ICSG 211. It is noted that the voltage source from which the source voltage signal 221 originates can either be one of the DERs 16 or the utility grid 3. It will be appreciated that, when the voltage source being monitored is one of the DERs 16, the source voltage signal 221 is obtained from the branch breaker 14A connected to the DER 16. When the voltage source being monitored is the utility grid 3, the source voltage signal 221 is obtained from the main breaker 12. A feedback frequency signal 223 output by the SPO 212, detailed further later herein, is also input to the ICSG 211. The feedback frequency signal 223 has an angular frequency (Q D corresponding to the frequency in hertz (Hz) of the monitored voltage source. Using the inputs to the ICSG 211 (i.e. the source voltage signal 221 and the feedback frequency signal 223), the ICSG 211 outputs the source voltage signal 221 and a number of internal control signals 225 (referred to hereafter as a singular internal control signal 225 for ease of explanation), which are then input to the SPO 212. The internal control signal 225 filters noise, such as harmonics and DC offset, from the source voltage signal 221 in order to track the fundamental portion of the source voltage signal 221. In addition, the internal control signal 225 is phase shifted 90 degrees from the source voltage signal 221.

The SG module 210 comprises a closed loop that produces the internal control signal 225, and the SPO 212 transforms the internal control signal 225 to a rotating reference frame in the closed loop using the estimated feedback frequency signal 223. That is, the SPO 212 generates a reference frame signal 227 from the internal control signal 225 and the source voltage signal 221, with the reference frame signal 227 remaining internal to the SPO 212. The reference frame signal 227 has an angular frequency corresponding to the frequency of the monitored voltage source (this corresponding angular frequency is facilitated by the internal control signal 225 and the feedback frequency signal 223 being input to the ICSG 211), and this enables the reference frame signal 227 to accurately extract the source voltage parameters from the source voltage signal 221.

In addition to outputting the feedback frequency signal 223, the SPO 212 outputs the source voltage parameters extracted by the reference frame signal 227, the source voltage parameters including: an RMS voltage signal 231, a phase angle signal 233, and a frequency signal 235. It is noted that the frequency signal 235 is output in hertz and can be used by other entities in the load center 10. In contrast, as previously stated, the feedback frequency signal 223 has an angular frequency (said angular frequency corresponding to the hertz frequency of the frequency signal 235), and is only used by the internal algorithm of the SG module 210). The decision-making entity or entities in the load center 10 can then use the SPO output signals 231, 233, and 235 to perform various functions needed to connect the load center 10 to the utility grid 3 or to island the load center 10 from the utility grid 3, such as synchronization and load shedding. The decision-making entity can vary depending on the specific decision(s) to be made. For example, in some instances, decisions can be made solely by the SEM controller 20, while in other instances, decisions can be made by the SEM controller 20 in conjunction with a DER 16. In addition, each SG module 210 can be modified to monitor any predefined abnormality/pollution in the utility grid 3.

Other advantages of the SEM controller 20 are the reduced cost resulting from omitting the OTS chip(s) from the load center 10 and the reduced footprint of the hardware in the load center 10. In a chip-based system, an increase in the number of phases requires an increase in the number of OTS chips. With the SEM controller 20, when the number of sensed inputs increases, the number of SG modules 210 can be scaled up/down in the firmware without increasing implementation cost. In addition, the SEM controller 20 does not have to communicate with external components (i.e. the OTS chips), thus reducing the number of complexities in the load center 10.

Figure 3:
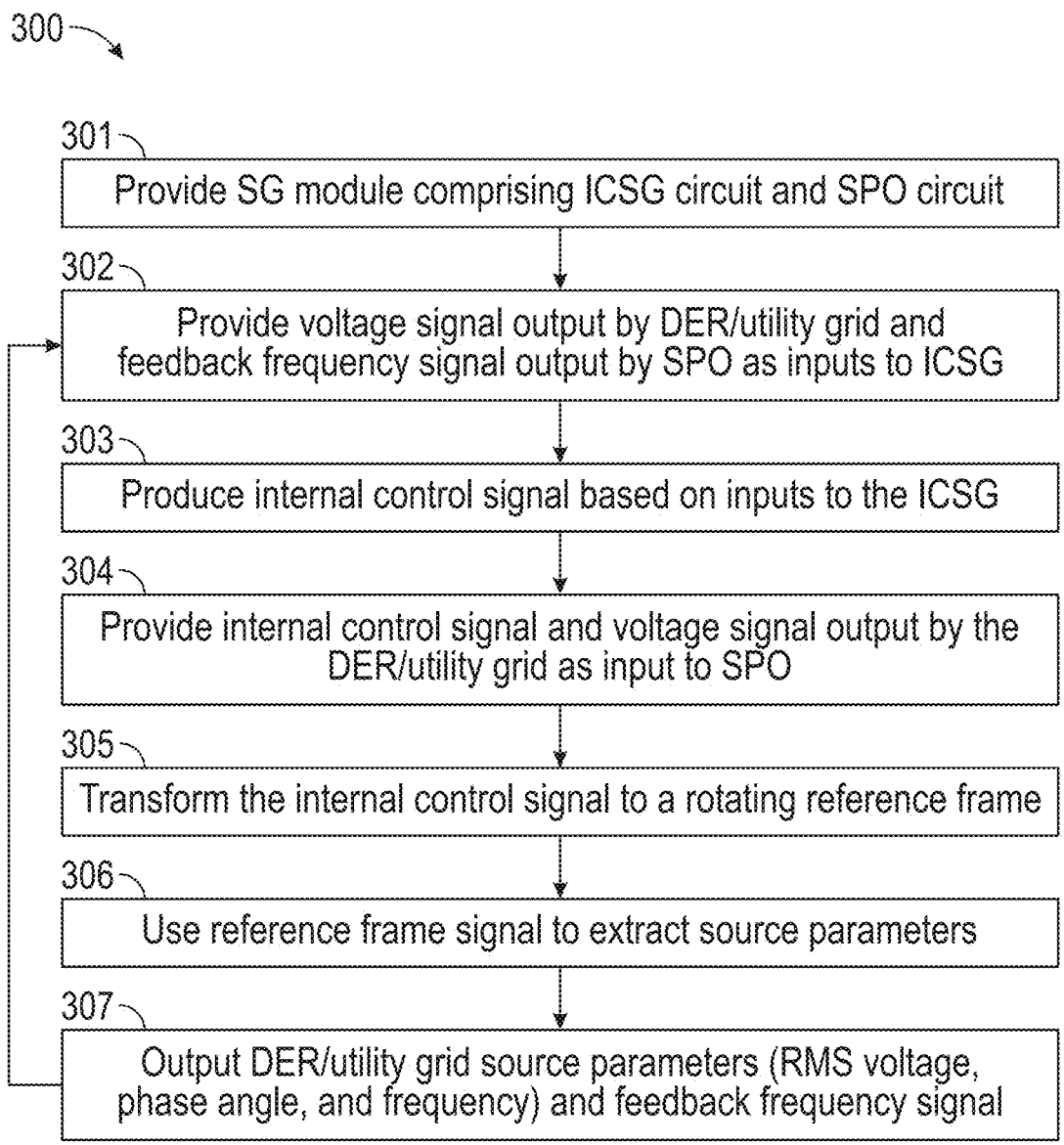
FIG. 3 is a flow chart of a method for determining source parameters of voltage sources in a load center, in accordance with an example embodiment of the disclosed concept.

FIG. 3 is a flow chart for a method 300 of determining source parameters of a voltage source supplying power for a power phase in a load center, in accordance with an exemplary embodiment of the disclosed concept. The voltage source being monitored is referred to as the "monitored voltage source" in connection with the description of the method 300. The method of FIG. 3 may be employed, for example, by the SEM controller 20 shown in FIG. 1 and is described in conjunction with the SEM controller 20, power distribution system 1, and SG module 210 shown in FIGS. 1 and 2A-2C. However, it will be appreciated that the method may be employed in other devices and systems as well without departing from the scope of the disclosed concept. In the power distribution system 1, the monitored voltage source can be either the utility grid 3 or one of the DERs 16. As previously noted, because the innovation disclosed herein lies in eliminating the need to use OTS chips with DERs, the method 300 is explained primarily in the context of the source voltage being produced by a DER.

At step 301, the SG module 210 is provided, with the SG module 210 comprising the ICSG 211 and SPO 212. At step 302, inputs are provided to the ICSG 211. The inputs provided to the ISCG 211 include the source voltage signal 221 output by the monitored voltage source (e.g. the DER 16) and the feedback frequency signal 223 output by the SPO 212. At step 303, the ICSG 211 produces the internal control signal 225 based on the inputs to the ICSG 211. It is noted that the ICSG 211 filters noise (e.g. harmonics and DC offset) from the source voltage signal 221 when generating the internal control signal 225 at step 303 so that the fundamental portion of the source voltage signal 221 can be tracked in subsequent steps. At step 304, the internal control signal 225 and the source voltage signal 221 are provided as inputs to the SPO 212.

At step 305, the SPO 212 transforms the internal control signal 225 to a rotating reference frame. That is, the SPO 212 generates the reference frame signal 227 from the internal control signal 225 and the source voltage signal 221 (the reference frame signal 227 having the same angular frequency as the feedback frequency signal 223, which is an angular frequency corresponding to the hertz frequency of the monitored voltage source). At step 306, the SPO 212 uses the reference frame signal 227 to extract the source voltage parameters from the source voltage signal 221. At step 307, the SPO 212 outputs RMS voltage 231, phase angle 233, and frequency 235 corresponding to the output of the voltage source (e.g. DER 16), as well as the feedback frequency 223. After step 307, the method returns to step 302, so that the feedback frequency 223 can be provided as input to the ICSG 211 along with the source voltage signal 221.

There are several advantages to using the software-based approach of the SEM controller 20 to track source voltage parameters when compared to the use of OTS chips. The SG module 210 can be used with both 50 Hz and 60 Hz systems and does not rely on zero crossing detection. As explained in connection with FIGS. 2A-2C, the SG module 210 is modular relative to a single phase of power and can be duplicated as needed in order to track source parameters in multiple phases of power. The SG module(s) 210 can be selectively controlled to optimize power consumption of the load center 10 (for example, grid synchronization mode needs only two SG modules 210 as compared to four SG modules 210 being needed in grid forming mode), whereas in a load center utilizing OTS solutions, all of the OTS chips will always be on. The execution time of each SG module 210 is less than any available OTS solution (the source parameter measurement scheme 200 uses less than 1000 instruction cycles) and does not put any additional burden on the SEM controller 20. Dynamic performance of the SEM controller 20 is comparably better than the existing OTS solutions. The source parameter measurement scheme 200 is controller agnostic, such that any microcontroller can be configured to be the SEM controller 20 by running software with the source parameter measurement scheme 200 on the microcontroller. Removing OTS chips reduces system costs and improves system reliability due to the use of fewer components.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A system energy manager for use with a load center, the load center being structured to connect a plurality of loads to a plurality of voltage sources through a main bus, the plurality of voltage sources including a utility grid and a number of distributed energy resources, DERs, the system energy manager comprising:
    a system energy manager, SEM, controller, the SEM controller being configured to execute a source parameter measurement scheme, the source parameter measurement scheme including a number of signal generator modules, each signal generator module comprising:
        an internal control signal generator, ICSG, module; and
        a source parameter output, SPO, module,
    wherein, for each given voltage source in the plurality of power sources, the SEM controller is configured to receive a source voltage signal from the given voltage source,
    wherein the ICSG module is configured to receive the source voltage signal and a feedback frequency signal as input, with the feedback frequency signal having an angular frequency,
    wherein the angular frequency corresponds to a fundamental frequency of the source voltage signal, the fundamental frequency being in hertz,
    wherein the ICSG module is configured to output the source voltage signal and an internal control signal,
    wherein the SPO module is configured to generate a reference frame signal from the internal control signal and the source voltage signal, the reference frame signal having the angular frequency,
    wherein the SPO module is configured to extract source voltage parameters from the source voltage signal using the reference frame signal, and
    wherein the SPO module is configured to produce the feedback frequency signal using the internal control signal and the source voltage signal.

2. The system energy manager of claim 1,
    wherein the number of signal generator modules corresponds in number to the number of phases of power in the load center, such that each signal generator module corresponds to a unique one of the phases of power.

3. The system energy manager of claim 1,
    wherein the source voltage parameters include RMS voltage.

4. The system energy manager of claim 1,
    wherein source voltage parameters include phase angle.

5. The system energy manager of claim 1,
    wherein source voltage parameters include frequency, the frequency being in hertz.

6. The system energy manager of claim 1,
    wherein the ICSG module is configured to filter noise from the source voltage signal when generating the internal control signal.

7. The system energy manager of claim 1,
    wherein the internal control signal is phase shifted 90 degrees from the source voltage signal.

8. A method of determining source parameters for a voltage source in a load center, the method comprising:
    providing a signal generator module, the signal generator module comprising an internal control signal generator, ICSG, module and a source parameter output, SPO, module;
    providing a source voltage signal and a feedback frequency signal as inputs to the ICSG module, the source voltage signal being output by the voltage source;
    producing an internal control signal with the ICSG module based on the inputs to the ICSG module;
    providing the internal control signal and the source voltage signal as inputs to the SPO module;
    generating a reference frame signal by transforming the internal control signal to a rotating reference frame using the SPO module;
    using the rotating reference frame signal to extract the source parameters in the SPO module; and
    outputting the source parameters and the feedback frequency signal.

9. The method of claim 8,
    wherein the feedback frequency signal has an angular frequency,
    wherein the source voltage signal has a hertz frequency,
    wherein the angular frequency corresponds to the hertz frequency.

10. The method of claim 9,
    wherein the source parameters include RMS voltage.

11. The method of claim 9,
    wherein the source voltage parameters include phase angle.

12. The method of claim 9,
    wherein the source voltage parameters include output frequency, the output frequency being in hertz.

13. The method of claim 8,
    wherein transforming the internal control signal to a rotating reference frame comprises generating the reference frame signal from the internal control signal and the source voltage signal,
    wherein the source voltage signal has a hertz frequency, and
    wherein the reference frame signal has an angular frequency that corresponds to the hertz frequency.

14. The method of claim 8,
    wherein producing the internal control signal includes filtering noise from the source voltage signal.

15. The method of claim 8,
    where the internal control signal is phase shifted 90 degrees from the source voltage signal.

* * * * *